US009574137B2

(12) United States Patent
Pochert et al.

(10) Patent No.: US 9,574,137 B2
(45) Date of Patent: Feb. 21, 2017

(54) APPARATUS AND METHOD FOR RECYCLING BITUMINOUS MATERIAL BODIES BY MELTING

(71) Applicants: Jan-Niels Pochert, Berlin (DE); Daniel Appels, Saas Fee (CH)

(72) Inventors: Jan-Niels Pochert, Berlin (DE); Daniel Appels, Saas Fee (CH)

(*) Notice: Subject to any disclaimer, the term of this patent is extended or adjusted under 35 U.S.C. 154(b) by 433 days.

(21) Appl. No.: 14/172,084

(22) Filed: Feb. 4, 2014

(65) Prior Publication Data
US 2014/0221708 A1   Aug. 7, 2014

Related U.S. Application Data

(60) Provisional application No. 61/760,306, filed on Feb. 4, 2013.

(51) Int. Cl.
*B01D 25/12* (2006.01)
*B01D 25/30* (2006.01)
(Continued)

(52) U.S. Cl.
CPC .............. *C10G 1/008* (2013.01); *B01D 25/125* (2013.01); *B01D 25/215* (2013.01);
(Continued)

(58) Field of Classification Search
CPC ......... B01D 17/00; B01D 17/12; B01D 25/12; B01D 25/122; B01D 25/125; B01D 25/21; B01D 25/215; B01D 25/30; B01D 25/302; B29B 17/02; B29B 17/0213; B29B 17/0217; B29B 2017/0213; B29B 2017/0217; B29B 2017/0224; C10C 3/00; C10C 3/002; C10C 3/007; C10C 3/10; C10C 3/12; C10C 3/18; B30B 7/00; B30B 7/02; B30B 7/023; B30B 9/04; B30B 9/06; B30B 9/26; B30B 9/262; B30B 15/04; B30B 15/041; B30B 15/045; B30B 15/06; B30B 15/062; B30B 15/064; B30B 15/08; B30B 15/16; B30B 15/165; B30B 15/168; B30B 15/30; B30B 15/32; B30B 15/34; C10G 1/00; C10G 1/008; C10G 1/02
(Continued)

(56) References Cited

U.S. PATENT DOCUMENTS 2,420,813 A * 5/1947 Camerota ............... B30B 7/023
                                                100/200
2,494,162 A * 1/1950 Camerota ................ B30B 7/02
                                                100/196
(Continued)

FOREIGN PATENT DOCUMENTS

AT          404447     * 4/1998   ............ B29B 17/02
DE   10 2009 052 664     5/2011
(Continued)

OTHER PUBLICATIONS

Derwent Translation of Document AT-404,447, Published Apr. 15, 1998.*
(Continued)

*Primary Examiner* — Joseph Drodge
(74) *Attorney, Agent, or Firm* — Bachman & LaPointe, PC

(57) ABSTRACT

The invention shows an apparatus for recycling bituminous material bodies by melting, in particular for recycling bituminous composite material bodies comprising a composite material and a bituminous material, in particular roofing materials, in particular in the form of bituminous covering layers of roofing sheets, the apparatus including:
  a vessel having a vessel wall surrounding an interior space of the vessel extending along a vertical axis of the vessel for receiving the bituminous material bodies,
(Continued)

a bottom plate and a compression plate extending transverse to the vertical axis wherein at least the compression plate has a number of through flow orifices adapted to allow a through flow of molten bituminous material, wherein the plates are movable along the vertical axis such that in a first operating state the compression plate is in a middle position for forming a melting space of larger size between the compression plate and the bottom plate for melting bituminous material in the melting space wherein the bottom plate is in a melting position, in a second operating state the compression plate is in a lower position for forming a compression space of minor size between the compression plate and the bottom plate for compressing solid residues and/or solid composite material in the compression space, and wherein molten bituminous material is retained in a storing space above the compression plate for storing and/or discharging bituminous material, wherein the bottom plate is in a compression position, wherein the compression plate is movable from the middle position to the lower position.

26 Claims, 6 Drawing Sheets

(51) Int. Cl.
| | | |
|---|---|---|
| *B29B 17/02* | (2006.01) | |
| *B30B 7/02* | (2006.01) | |
| *C10C 3/18* | (2006.01) | |
| *B30B 9/26* | (2006.01) | |
| *B30B 15/04* | (2006.01) | |
| *B30B 15/06* | (2006.01) | |
| *B30B 15/16* | (2006.01) | |
| *C10G 1/00* | (2006.01) | |
| *B01D 25/21* | (2006.01) | |
| *B30B 15/32* | (2006.01) | |
| *C10G 1/02* | (2006.01) | |

(52) U.S. Cl.
CPC ............ *B01D 25/302* (2013.01); *B30B 7/023* (2013.01); *B30B 9/262* (2013.01); *B30B 15/062* (2013.01); *B30B 15/165* (2013.01); *B30B 15/32* (2013.01); *C10C 3/18* (2013.01); *C10G 1/02* (2013.01); *B29B 2017/0217* (2013.01); *B29B 2017/0224* (2013.01)

(58) Field of Classification Search
USPC ....... 210/175, 184, 225, 231, 774; 264/37.1, 264/37.18, 109; 100/38, 45, 71, 72, 90, 92, 110, 100/115, 116, 126, 129, 214, 215, 219, 226, 100/269.12, 315, 324; 422/187; 585/240
See application file for complete search history.

(56) References Cited

U.S. PATENT DOCUMENTS

| | | | | |
|---|---|---|---|---|
| 3,180,195 | A * | 4/1965 | Clark | ........................ C10C 3/18 83/408 |
| 3,302,556 | A * | 2/1967 | Durbin | ..................... B21J 13/04 100/214 |
| 4,726,846 | A * | 2/1988 | Jackson | ................... C10C 3/007 106/284.01 |
| 5,100,544 | A * | 3/1992 | Izutani | ................. B01D 61/362 210/175 |
| 5,156,087 | A * | 10/1992 | Cusson | ................... B29C 43/52 100/322 |
| 5,217,530 | A * | 6/1993 | Grzybowski | ........... C08L 95/00 106/163.01 |
| 5,626,659 | A * | 5/1997 | Chivers | .................... C08L 95/00 106/282 |
| 2003/0122273 | A1* | 7/2003 | Fifield | ................... B29C 67/243 264/109 |
| 2012/0318718 | A1* | 12/2012 | Simpson | ................ C10G 31/09 208/391 |

FOREIGN PATENT DOCUMENTS

| | | | |
|---|---|---|---|
| EP | 1 144 171 | | 5/2004 |
| EP | 1 813 360 A2 | | 8/2007 |
| EP | 1 813 360 A3 | | 6/2014 |
| NL | 1031868 | | 11/2007 |
| WO | 98/31519 | | 7/1998 |
| WO | WO-00/43184 | * | 7/2000 ............ B29B 17/00 |
| WO | 02/28610 | | 4/2002 |

OTHER PUBLICATIONS

European Office action for Application No. 14 153 818.1-1706 dated Apr. 19, 2016.
European Apln. No. 13153937.1-1706 Search report dated Jun. 10, 2013.

* cited by examiner

APPARATUS AND METHOD FOR RECYCLING BITUMINOUS MATERIAL BODIES BY MELTING

BACKGROUND OF THE INVENTION

The present invention relates to an apparatus and a method for recycling bituminous material bodies by melting. In particular, the present invention relates to an apparatus and method for recycling bituminous composite material bodies comprising a composite material and a bituminous material. In particular, the apparatus and method are adapted for recycling roofing materials, in particular in the form of bituminous covering layers of roofing sheets.

The bituminous material bodies mentioned above for recycling usually have additional to a bituminous layer also possibly non-bituminous layers like a mineral covering layer or a bitumen reinforcement layer. Such bituminous material bodies, in particular roofing sheets or the like, are known from the prior art and are used in particular to cover and seal flat roofs e.g. For instance a bituminous layer can be provided as a conventional bitumen layer or as a polymer modified bitumen layer. The bitumen can in principle be oxidized or can be distilled bitumen. The reinforcement layer or other composite material can be a polyester fleece, fiberglass mat, fiberglass fabric or felt core.

After reaching the end of their service life, the roof sheets or other bituminous material bodies are usually processed for energy recovery, i.e. they are burnt as a substitute fuel in coal fire power stations. This kind of recycling causes considerable $CO_2$ emissions and does not constitute full recycling of the roof sheets in the real sense aiming to a full material recycling.

Varieties of distillation bitumen and oxidized bitumen are basically in primary use nowadays to provide a bituminous layer in a bituminous material body. Bitumen as such is obtained by distilling crude oil. It consists of a mixture of different hydrocarbons and on account of its properties as one of the most used sealants in the construction industry. Distillation bitumen or refined bitumen usually refers to residual oil that remains after fractional distillation at reduced pressure and a temperature of approximately 350° C. These soft to medium-hard bitumen varieties are primarily used in road construction. Distillation bitumen may also refer to a high vacuum bitumen, which is obtained by further processing or further distillation of distillation bitumen under a vacuum. High vacuum bitumens, i.e. a special form of distillation bitumen, are mostly used for asphalt, floors, streets and rubber goods, due to their hardness and can also be used as distillation bitumens for a bituminous layer in a bituminous material body. Oxidized or blown bitumens are obtained by blowing air into distillation bitumen air at a temperature of approximately 250° C. Depending on this specific process used, it is possible to give the bitumen in roof specific properties in respect of resistance, to heat or cold.

On the other hand it has been found that hot processing and/or recycling of bituminous material bodies in principle can be achieved by melting the bituminous material bodies. However, a problem arises due to different melting or softening or transition points of temperature of the bituminous material in the bituminous material bodies on the one hand and the composite material in the material bodies or other residues on the other hand; usually the composite material and other residues can also comprise e.g. solid dirt, slate chippings and the like and these kind of composite material and other residues may remain solid when the bituminous material is already in a melted state.

In the prior art several attempts and suggestions have been made to handle bituminous material bodies for recycling by melting in an apparatus and a method; one of which is described for instance in WO 98/31519-A. As described therein the bituminous material bodies are heated such that the bituminous material melts. After that the bitumen and the other components forming the roofing materials are separated from each other. After sorting, reducing and melting, the material is sieved and sorted. This requires a comparable high amount of energy and is rather cumbrous.

Further in EP 11 44 171 B1 a method and apparatus has been described wherein the bitumen component of the bituminous material bodies—herein also referred to as the bituminous material—is melted in a vessel and separated from other non-melting components—herein also referred to as a composite material—of the bituminous material bodies. This is established by means of pressing or pushing together those non-melting components of composite material and all other residues in the vessel. The disclosure of the aforementioned patent EP 11 44 171 B1 herewith is incorporated in its entirety by reference into this application.

The basic principal of separating a bituminous material in the melted state from a composite material of a bituminous material body to be recycled as such has been found to be a good approach; however, still it remains to simplified and the apparatus and the method approach advantageously should be more efficiently to be handled. In particular the amount of energy and the separation process as such needs to be further improved.

EP 11 44 171 B1 provides a press means formed by a plate which is movable in the vessel over the bottom in the direction of a wall of the vessel which plate fits in cross section vertically in the vessel.

Further NL 1031868 describes an alternative approach wherein such plate is movable in the vessel in the vertical direction of a wall of the vessel wherein the plate fits in a cross section horizontal in the vessel. To prevent clogging of through flow orifices in the plate, the through flow orifices of the plate need to have a conical shape.

WO 02/28610 A1 describes a method and apparatus for the recycling of bituminous or tar containing materials, wherein these materials are separated from each other in a container by means of the application of a force onto the bituminous or tar containing materials such as a pressure force or a centrifugal force, which is brought to bear on the materials. In an embodiment, in the container, a base plate is formed and above the base plate, at a distance there from, a pressure plate is provided, which is movable along guiding elements in a direction towards and away from the base plate by means of a drive means. The base plate and the press plate can be provided with perforations or openings with varying diameter. The container is lowered down into a vessel, and the vessel is filled with a melting medium, which is liquid hot bitumen or hot fuel oil or another hot melting medium. The container with in it the rest materials that are pressed together in the form of a block is finally raised and lifted out of the vessel and the block can thereafter be handled as waste, for instance burnt.

Also these designs can be improved insignificantly.

SUMMARY OF THE INVENTION

These and other aspects are addressed by the invention, the object of which is to specify a method and apparatus for recycling bituminous bodies by melting, which are further improved in view of the above mentioned problems. At least one of the aspects addressed above shall be addressed by the invention. At least the object of the invention is to provide a method and apparatus with an alternative approach.

In the particular preferred aspect the object of the invention is to improve a separation of the composite material and the bituminous material of a recyclable bituminous material body. In particular the separation process shall be achievable in a more efficient way. In particular it is an object to improve the quality of the recycled bituminous material at the end of recycling the bituminous material bodies by melting. In particular retaining of composite material and other solid residues during the separation process shall be more effective and/or provided with higher reliability. In particular an apparatus for recycling still should be construed in a less complicated but nevertheless efficient way; in particular the production of the apparatus shall be more simplified as compared to the prior art.

The object with regard to the apparatus is achieved by the invention with the subject-matter of claim 1.

The object with regard to the method is achieved by the invention with the subject-matter of method claim 24.

Further developments of the invention are outlined in the dependent claims. Thereby the mentioned advantages of the proposed concept are even more improved.

The invention starts in a first particular preferred developed variant from the consideration, that active filter means as described with a method and apparatus for recycling bituminous material bodies of the prior art have some disadvantages with regard to efficiency and quality of the recycling process, but also with regard to handling of the method and apparatus itself. A significant advantage of the passive filter means provided by means of the composite material and/or solid residues below the compression plate is that further effort for maintenance or handling of the passive filter means is omitted. Even more the passive filter means turns out to be very efficient and effective for filtering the melted bituminous material. Indeed, it has been shown that the passive filter means is adapted to provide a high quality primary bituminous material from the recycling process. The reason is, that the solid composite material and/or other solid residues of the bituminous material bodies to be recycled as a matter of fact form a specifically advantageous filter process for the bituminous material; it turns out, that by gathering and pressing of the bituminous material bodies to be recycled and the composite material provided therein a passive filter means is formed once the composite material and/or other solid residues are dissolved in the melted bituminous material; i.e. basically upon heating the bituminous material bodies above the softening-temperature and/or melting temperature during the movement of the compression plate from the middle position to the lower position.

The concept of the first particular preferred developed variant recognized, that on the one hand the through flow orifices in the compression plate can be designed in form and size such that on the one hand a composite material and/or other solid residues are retained effectively below the compression plate to form a passive filter means. In particular this leads to a particular preferred upper limit of the width of orifice. This is because as once the width of orifice exceeds such upper limit the composite material and/or other solid residues will not be restrained below the compression plate once the majority thereof tends to pass through an oversized through flow orifice with the melted bituminous material. On the other hand it turns out that a lower limit of the widths of through flow orifices in a compression plate is provided advantageously. The reason is, as once a through flow orifice width becomes too small the orifice will be clogged by means of non-melting material like composite material and/or other solid residues. In such case melted bituminous material will not be restricted to flow through the through flow orifices and thus the separation process is slowed down or even has to be stopped when moving the compression plate form the middle position to the lower position.

In particular it turns out, that the downward velocity for moving the compression plate from the middle position to the lower position is to provide it with an upper limit in combination with the margin of through flow orifices between a lower limit and an upper limit as described above to provide for the advantageous passive filter means. Namely in case of a downward velocity below an upper limit and a through flow orifice between the margins of a lower limit width and an upper limit width of through flow orifices an optimized passive filter means is provided below the compression plate whereas still filtering and separation process of the melted bituminous material is efficiently executed upon movement of the compression plate from the middle position to the lower position.

Still also it turns out, that making the through flow orifices of sufficiently width, advantages are provided upon melting the bituminous material; namely once the through flow orifices are sufficiently wide a circulation of melting bituminous material in the first operating state of the apparatus is affordable in an advantageous region; this supports efficient heating of the bituminous material bodies and lowers energy supply for heating.

In particular it turned out that the concept of the first particular preferred developed variant will recognize the filter functionality of the press cake built up upon movement of the compression plate from the middle position to the lower position. In particular the first particular preferred developed variant astonishingly found that polyester fleece, glass fleece or other composite material or composite residue behave during the recycling process as described like a filter material when the apparatus and method approaches from the first operating state to the second operating state as claimed. Several experiments and expertise have shown that once the downward velocity is sufficiently low—in particular below an upper limit—filler materials or the like composite material or solid residue, in particular also large molecular weight fractions of the bitumen like SBS and ABB (polyester, polymer and caoutchouc and alike modified bitumen), can tend in the press cake to built up a passive filter means which functions on large molecular scale.

It has been found that a particular pure primary bituminous material is separated above the compression plate during the recycling process and in the recycling apparatus claimed; namely a primary bitumen basically free—in the prescribed margins and quality definitions—from filler material or the like composite material or other residues and in particular advantageously also free of polymer additions or the like (in particular due to gathering of SBS and ABB in the filter cake).

It turns out that once the margins of the process and apparatus are adapted as described, the press cake dynamically evolves to provide micro channels of sufficiently small size and these are adapted to retain filler material of large molecular scale and polymer addition like SBS and ABB. Thus, whereas polymer and other large molecular weight additions are retained in the micro channels still the bituminous material finds other channels in the filter cake and through the through flow orifices in the compression plate and thus is efficiently separated above the compression plate as a particular pure primary bitumen.

In a particular preferred further development the invention provides for an upper limit of the downward velocity of below 15 cm/min, in particular of below 10 cm/min and the downward velocity is above 0 cm/min. In a further preferred development the concept of the invention leads to the through flow orifices in form of slits. In particular the slits have a lower slit width and an upper slit length. Astonishingly it turns out that the concept of the invention works well already once the through flow orifices have a lower width to retain composite or other filler material and/or solid residues according to the concept.

In a particular preferred still further development the through flow orifices lower cross section or dimension, in particular lower width thereof like lower slit width or the like, is below 10 mm, in particular below 4 mm, in particular below 2 mm.

Independently, in particular alternatively are additionally, a another further development provided for a ratio of a sum of open cross sections of through flow orifices to the total closed area of the compression plate; the ratio turns out to be advantageously below 10%, in particular below 5%. In a particular preferred embodiment the ratio is below 2%, in particular below 1%, in particular above 0.001% or above 0.01%, in particular above 0.1%.

In a still further another particular preferred development the orifices in the compression plate have plan-parallel boundary surfaces. This has advantages in the through flow dynamics of the molten bituminous material and also in the processing of the compression plate.

In essence the concept of the first particular preferred developed variant provides for an apparatus and a method adapted for recycling bituminous material bodies by melting, wherein a lowering velocity of the compression plate is sufficiently small, in particular in combination with the size of the through flow orifices in the compression plate, such that a inventive passive filter means is provided below the compression plate for filtering the recyclable bituminous material in a melted state to provide a particular high quality primary bitumen, even without polyester or other polymer material residues.

It turns out, that the concept of the first particular preferred developed variant is particular effective in a development wherein the vessel has an interior volume of between 5 $m^3$ to 12 $m^3$, in particular wherein a cross section of compression plate is between 2 m and 4 m. A particular preferred height of vessel can be between 1 m and 5 m.

Advantageously it turns out that the apparatus and method claimed is adapted to the use for separation of tar and bitumen. Due to the vertical axis arrangement of the vessel due to the different density of tar and bitumen (1.2 $g/cm^3$ and 1.0 $g/cm^3$ respectively), a hot mixture of tar and bitumen will separate once the mixture is at rest. Heavy tar fractions gather at the bottom of the vessel whereas lighter bitumen fractions gather above the tar fractions. Thus the fractions (the bitumen) can be drawn off from the vessel, in particular after having lowered the compression plate. In particular, additionally or alternatively, the fractions (the tar fractions from below regions of the vessel) can be drawn off from the vessel before the lowering of the compression plate.

Further preferred developments are of particular advantage for improving apparatus construction and handling of the apparatus and energy efficiency of the heating process can also be derived from the further dependent claims and the drawing.

Preferably a hydraulic and/or pneumatic drive is adapted to move at least the compression plate along the vertical axis from the middle position to the lower position with the downward velocity.

Preferably a drive is adapted to move at least the compression plate along the vertical axis by exerting pressure at least to a first number of drive rods adapted to move the compression plate between said positions.

Preferably a second number of guidance rods are adapted to establish a guidance link at least of the bottom plate to the compression plate wherein a lower distance between the bottom plate and the compression plate is variable dependent on the position of the compression plate, and an upper distance between the bottom plate and the compression plate is limited by a stop collar.

Preferably a drive rod extends to a first line of openings in said plates and a guidance rod extends to a second line of openings in said plates.

Preferably a first line of openings in said plates is located on an outer circumference line on a respective plate and a second line of openings in said plates is located on an inner circumference line on a respective plate.

Preferably the number of drive rods and the number of guidance rods and respective openings are the same, in particular the number amounts to three, in particular each rod is arranged along a first and second inner circumferential cylindrical shape.

Preferably further comprising a cover plate wherein the compression plate is arranged between the bottom plate and the cover plate.

Preferably when the bottom plate is in a melting position, the bottom plate in a lowermost region of the vessel wall along the vertical axis and the vessel is closed by the cover plate and the compression plate is in an upper region of the vessel wall along the vertical axis.

Preferably when the bottom plate is in a compression position, the bottom plate in a lowermost region of the vessel wall along the vertical axis and the vessel is closed by the cover plate and the compression plate is in a lower region of the vessel wall along the vertical axis.

Preferably when the bottom plate is in a discharge position, the vessel is open and the compression plate and the cover plate are in a region above the vessel wall along the vertical axis, in particular the bottom plate in the region above the vessel wall along the vertical axis.

Preferably the interior space is adapted for receiving the bituminous materials, wherein the vessel wall has an inner wall defining the interior space and adapted for contacting the bituminous materials, and an outer wall defining an annular space between the inner wall and the outer wall, which annular space is adapted to receive a heating liquid for heating the interior space, in particular the bituminous materials.

Preferably the inner wall and the out wall are connected at a plurality of hubs, in particular each hub is formed as pillow plated hub, in particular of a weld hub.

Preferably the interior space is adapted to be open to the surrounding, in particular an overflow channel is connectable in a flow connection to the interior space.

Preferably the interior space is adapted to be pressurized with a pressure below atmospheric pressure, in particular with a vacuum pressure.

Preferably further comprising a microwave heating arrangement is adapted to heat the interior space, in particular the bituminous materials.

Preferably the apparatus further comprises: a first and second flow pipe connected to the vessel in a flow connection to the interior space of the vessel wherein a propeller is adapted to circulate molten bituminous materials in the first and second flow pipe and the interior space of the vessel.

Preferably in a third operating state the compression plate is in an upper position for forming a discharge space between the compression plate and the bottom plate for discharging bituminous materials from the discharge space, wherein the bottom plate is in a discharge position.

Preferably the discharge position of the bottom plate is adapted such that the bottom plate surface aligns with a slider element of a slide and/or a discharge receipt tray, wherein the slide is adapted to move the slider element along the surface of the bottom plate to move the compressed solid residues and/or composite material to the discharge receipt tray.

Preferably the discharge receipt tray is heatable and/or pivotable; in particular pivotable from a horizontal surface position to a vertical surface position to release the compressed solid residues and/or composite material.

Preferably a head frame is adapted for supporting the vessel and/or a slide and/or a tray wherein a vessel part of the a head frame comprises a number of columns extending a along an outer circumferential cylindrical shape, in particular wherein a column is basically aligned in a radial extending vertical tier with a guidance rod and a drive rod.

In a second particular preferred developed variant of the invention, energy transmission to the bituminous material, in particular also tar containing material, can be improved and/or an efficiency of the heating process can be improved.

Preferably, a stirring unit is provided, wherein the stirring unit has a shaft and an elongated stirring member rotatable arranged between the bottom plate and a vessel bottom. Preferably the shaft is adapted to rotate the elongated stirring member in a stirring space between the bottom plate and the vessel bottom. These developments recognized that a stirring unit is of particular advantage for improving efficiency of a heating process of the bituminous material to be recycled, stirring the bituminous material to be recycled allows transferring heat throughout the vessel in a very efficient way. Thereby, a preferred agitation or turbulence in the fluid bitumen in the vessel can be achieved. It turns out that the melting process is more efficient and heat transfer to the bituminous material to be recycled is more efficient.

Additionally or alternatively the shaft is hollow with and upper outlet adapted to feed through a bituminous fluid, in particular a bituminous melting fluid. With synergetic effect, the development further recognized that the shaft can be formed as a hollow shaft and thus is adapted to feed through a bituminous fluid into the vessel. Preferably, thereby bituminous material and/or bituminous melting fluid can be injected into the vessel in a heated state. For instance, bituminous fluid from the circulation pipe can be provided as a stream to the feed through arrangement of the hollow shaft and/or bituminous melting fluid from an external tank can be provided additionally to the feed through arrangement of the hollow shaft. Thereby, an even more improved preferred agitation or turbulence in the fluid bitumen in the vessel can be achieved. It turns out that the melting process is even more efficient and heat transfer to the bituminous material to be recycled is more efficient.

Preferably, the hollow shaft is connected to the vessel by means of an access opening in the vessel bottom connecting the shaft to the vessel. Preferably, the connection is along a central axis of the vessel to the vessel bottom.

Further, in a first modification, the shaft has an opening out into the space between the bottom plate and the compression plate. In thereby a jet stream of bituminous fluid into a bituminous material to be recycled in the melting space and/or into a composite material in the compression space between the bottom plate and the compression plate can be formed.

Said first modification recognized that this is particularly advantageous for forming a jet stream of bituminous fluid into a bituminous material to be recycled in the melting space and/or into a composite material in the compression space, in particular for forming a jet stream along a central axis into the space between the bottom plate and the compression plate. The pressed composite material thereby can be broken up or the packing thereof can be slackened; thus, an even more improved preferred agitation or turbulence in the fluid bitumen in the vessel can be achieved and/or residual bituminous material is forced away from the composite material in heated form.

In a further preferred modification, additionally or alternatively, the shaft has an opening out into the stirring space between the bottom plate and the vessel bottom. The further modification recognized that this arrangement is of particular advantage for forming a cushion stream of bituminous fluid into a bituminous material to be recycled in the melting space and/or into a composite material in the compression space between the bottom plate and the compression plate. Thereby, lifting of residues in the melted bituminous material in the melting space and/or lifting of the composite material in the compression space can be achieved. Thus again, a circulation of bituminous material through and around the composite material is upheld and enforced.

In the first and second modification, bituminous fluid from a fluid guiding connected to the aforementioned flow pipes for circulation of fluid bituminous material can be used for feed through at the hollow shaft and/or a fluid guiding connected to an external tank can be used to add heated bituminous melting fluid to the bituminous material to be recycled.

Preferably, the bottom plate on a bottom side thereof has a cup cladding, in particular formed by a circumferential arrangement, in particular of a number of fins; like for instance in the form a fence, to limit the bottom plate at its circumference. Thereby, leakage of bituminous fluid from the stirring space between the vessel bottom and the bottom plate is limited. In particular, for the second modification, it has been recognized to be advantageous that the hydraulic pressure of bituminous fluid is upheld or increased to a number of further through-flow orifices in the bottom plate. Thereby, sufficient hydraulic pressure is charged to the number of further through-flow orifices in the bottom plate to allow a through-flow of fluid bituminous material; the sufficient hydraulic pressure is sufficient to increase heat transfer, in particular to support a circulating flow in the vessel, in particular to increase a turbulent flow. In particular the sufficient hydraulic pressure is sufficient to lift solid residue of bituminous material to be recycled in the melting space and/or to lift the pressed composite material in the compression space. For instance, the cup cladding can be formed by a circumferential arrangement of a number of fins or other fence means.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. Further the features described in the description, the drawing and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does not exclude a plurality.

DETAILED DESCRIPTION

Figure 1:
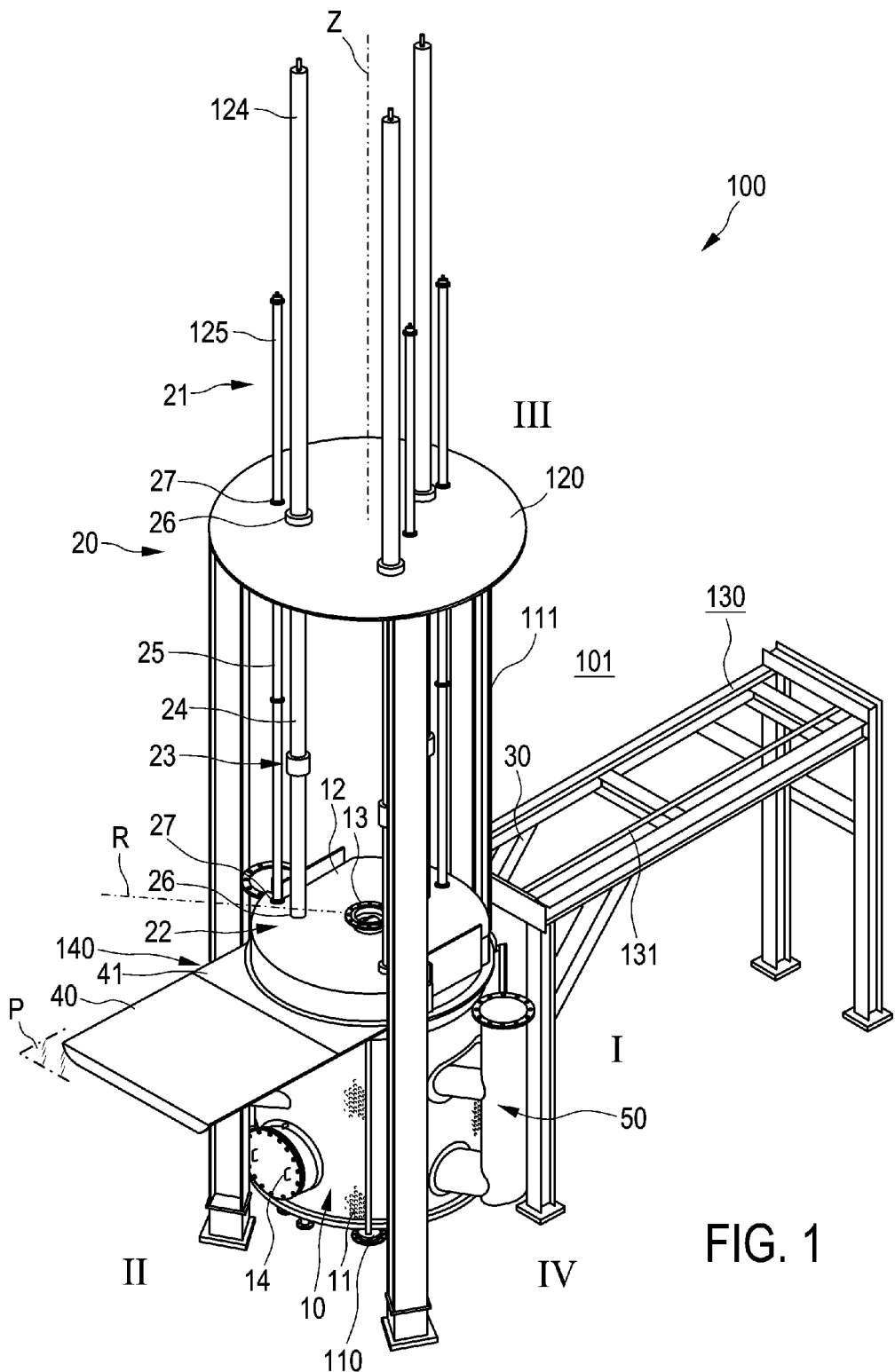
FIG. 1 a perspective view of a preferred embodiment of an apparatus for recycling bituminous material bodies by melting.

FIG. 1 shows a perspective view of an apparatus 100 for recycling bituminous material bodies (not shown) by melting. Such bituminous material bodies in particular can be in the form of bituminous composite material bodies comprising a composite material and a bituminous material. For instance roofing materials, in particular in the form of bituminous covering layers of roofing sheets as described in the introduction are suitable for recycling by melting with considerable advantages as compared to prior art practice of burning the bituminous material bodies. The recycling apparatus 100 is construed with a head frame 101 having a vessel part frame 110, a drive part frame 120, a slide part frame 130 and a tray part frame 140 to support respective parts of the recycling apparatus 100. Therein said parts basically comprise but are not limited to a vessel 10, a slider element 30 and a tray 40 and a drive with a plate arrangement 20 wherein the drive 21 and the plate arrangement 22 and a drive-plate linkage 23 are referenced separately.

Figure 2:
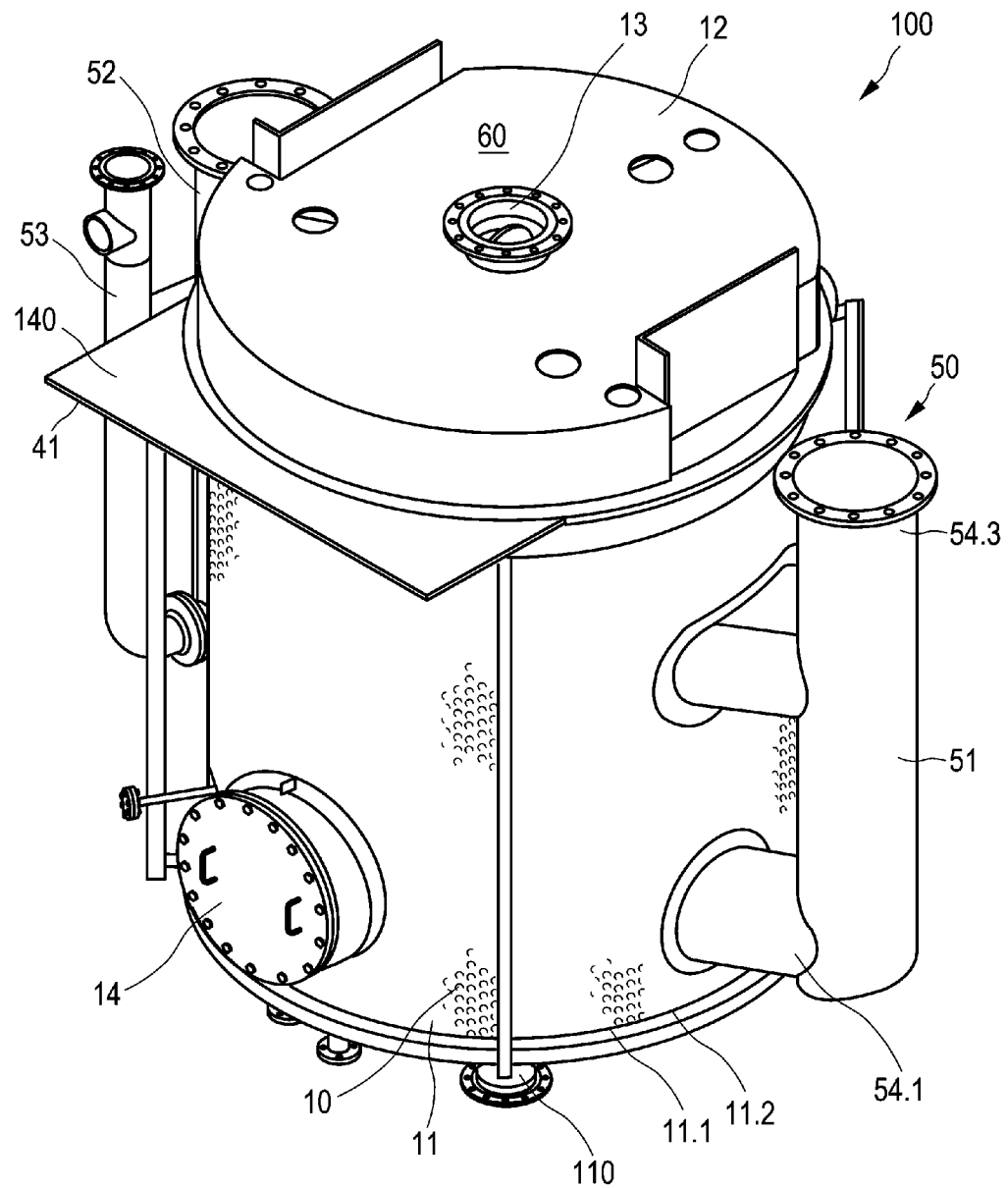
FIG. 2 a perspective view of a vessel of the apparatus of FIG. 1.

The vessel 10 as such is described in detail with regard to FIG. 2. As already visible in FIG. 1 the vessel 10 has a vessel wall surrounding an interior space (not shown) wherein the vessel itself extends along a vertical axis Z adapted to receive the bituminous bodies from the top along the direction of the vertical axis Z.

At least some of the plates of the plate arrangement 22 described below from a vessel lid 12. A first pipe nozzle 13 in the vessel lid 12 is adapted but not limited to draw off an upper and/or light fraction of melt from the interior space of the vessel 10. On the side of the vessel a side pipe nozzle 14 in the vessel wall 11 is adapted but not limited to draw off a lower, heavier weight fraction of melt from the interior space of the vessel 10. The upper pipe nozzle 13 thus for instance can be used to draw off a bitumen fraction of melt and the side pipe nozzle 14 can be used to draw off a tar fraction of the melt in the vessel.

The linkage 23 comprises a number of three drive rods 24 and a number of three guidance rods 25 where in each of the rods 24, 25 extend along the vertical axis Z partly to and partly through a first line of openings 26 and a second line of openings 25 in the vessel lid 12 as explained further in detail in the following. The first line of openings 26 is located on an inner circumference line on the vessel lid 12 and the second line of opening 27 is located on an outer circumference line in the vessel lid 12. The inner circumference line 28 and the outer circumference line 29 respectively is shown in FIG. 2 on the vessel lid. Further the vessel part 110 of the head frame 101 comprises a number of columns 111 extending along a very outer circumference cylindrical shape. Each of the columns 111 is basically aligned in a vertical tier along a radial extension R together with the guidance rod 25 and the drive rod 24. Assigned to the drive rods 24 is a drive cylinder 124 and to each of the guidance rods is assigned a further drive cylinder 125. As such the drive cylinders 124, 125 form a hydraulic drive 21 which is situated and supported by the drive part frame 120 as shown in FIG. 1. Upon movement of the drive 21 the linkage makes the vessel lid 12 to move up or down and as described further in detail in particular with reference to the specific plates of the vessel lid 12 and/or the bottom plate in the vessel 10.

Further as shown in FIG. 1 the slider element 30 is adapted to be movable on or by rail bars 131 supported by the frame slide part 130. Thus a slide element 30 can be moved from the one side I of the recycling apparatus 100 to and further approaching on the opening cross section of the vessel 10, i.e. right above the vessel wall 11 in the horizontal plane P which also aligns with the plane of a tray 40 at the tray part frame 140. Thus the slide element 30 by support of the frame slide part 130 is adapted to move elevated compressed material in the plane P from a vessel's opening to the tray 40. The tray 40 itself is heated and thus keeps the compressed material (not shown) in a soft state. Once the compressed material is ready for discharging into a container or the like, the tray 40 is fold down by pivoting the tray 40 along a hinge 41 such that the discharge mass of compressed materials falls of the tray 40 into a container beneath the tray (not shown). Also a tar fraction or other residual fraction in the lower region of the vessel can be drawn off from the pipe nozzle 14 by discharging into a container or a reservoir or discharge piping or the like.

In an alternative slightly varied embodiment the upper pipe nozzle 13 can be used to exert a vacuum pressure to the vessel which as such is useful to decrease a melting point of materials; thus this reduces the amount of heat input from melting bituminous material bodies in the interior space of the vessel 10. Thus recycling of the bituminous material bodies can be proceeded at considerably lower temperatures than at atmospheric pressure. Also in a varied embodiment the upper pipe nozzle 13 can be used as an overflow discharge opening which allows to discharge overflowed mass of bituminous material or other melted material which may occur when erroneously the vessel 10 is overloaded or otherwise an exert of pressure on melted material arises in the vessel 10. Thus unless for saving energy the vessel system 10 shown in FIG. 1 as part of the recycling apparatus 100 is construed as an open system which as such lowers the danger of over pressure or detonation, even at high temperatures and development of flammable gases upon heating of the bituminous material. Of course, also in a varied embodiment the upper pipe nozzle 13 can be used to discharge toxic gases or other gases and/or steam or the like from the interior space of the vessel 10 when heating the bituminous material bodies.

The tray frame 140 is located on the other side II of the recycling apparatus 100. The drive frame 120 is located on the upper part III of the recycling apparatus 100. The vessel frame part 110 is located at the lower side IV of the recycling apparatus 100.

In the following for identical or similar features of identical or similar function the same reference marks are used for simplicity. Thus as regards the description of the vessel in FIG. 2 it is partly already hinted at the description with regard to FIG. 1.

Further in FIG. 2 an overflow piping 53 is shown which is adapted additionally or alternative to the upper pipe nozzle 13 to discharge gaseous components or overflow melted components from the interior space of the vessel 10. Connected to the wall 11 and in through flow connection 54.1, 54.2 to the interior of the vessel is a first and second flow pipe 51, 52 as a part of a circulation piping 50 wherein the circulation piping 50 is adapted to circulate molten bituminous materials in the first and second flow pipe 51, 52 and the interior space of the vessel 10, once the bituminous material bodies are melted in the interior space of vessel 10. Thereby the amount of heat energy transferred to the interior space of the vessel 10 and thus to the bituminous material bodies is effectively circulated and distributed which considerably lowers the amount of time for melting the bituminous material bodies.

Heat is transferred to the interior space of the vessel 10 alone or in addition, in particular auxiliary, by a microwave unit which is not shown in detail in FIG. 2.

The biggest amount of heat energy, however in general, is transferred to the interior space of the vessel 10 as provided by construing the vessel's wall 11 as a double wall namely with an inner wall 11.2 and an outer wall 11.1. The construction is such that the annular space defined between the inner and outer wall 11.2, 11.1 is adapted to receive a heated liquid, in particular heat oil or thermal oil or the like liquid medium such that the heat energy of the liquid heat medium is transferred by contact of heat through the inner wall 11.2 to the bituminous material bodies in the interior space of the vessel. As can be seen from the graphics of the outer wall 11.1 at the wall 11 of the vessel 10 the connection of the inner and outer wall 11.2, 11.1 is provided by means of pillow plated laser welding; this results in the pillow form of a hub kind of surface of the outer wall 11.1. Thereby a radial distance of perhaps 3 cm or the like are in particular useful to lower spacing of the inner and outer wall, in particular down to 5 or 3 mm or in a range between 2 mm and 5 cm for instance can be provided. The inner and outer wall 11.2, 11.1 are connected at the margins of a pillow by weld connection whereas beyond the weld connection points a through flow of heating liquid is possible throughout the annular space between the inner and outer wall 11.2, 11.1. Thus a homogenous heating of the interior space around the circumference and along the cylindrical shape in vertical axis Z extension is provided. This allows for a continuous and smooth and even heating of the bituminous material bodies in the interior space of the vessel 10.

The bituminous melted material in the vessel and the circulation piping arrangement 50 is directed into the interior space at a lower pipe connection 54.1 of the circulation piping arrangement 50 and out of the interior space at an upper pipe connection 54.2 of the circulation piping arrangement 50. Further circulation piping nozzles 54.3 can be used to draw off part of the melted material and/or to degas, ventilate or depressurize the interior space of the vessel 10.

Figure 4:
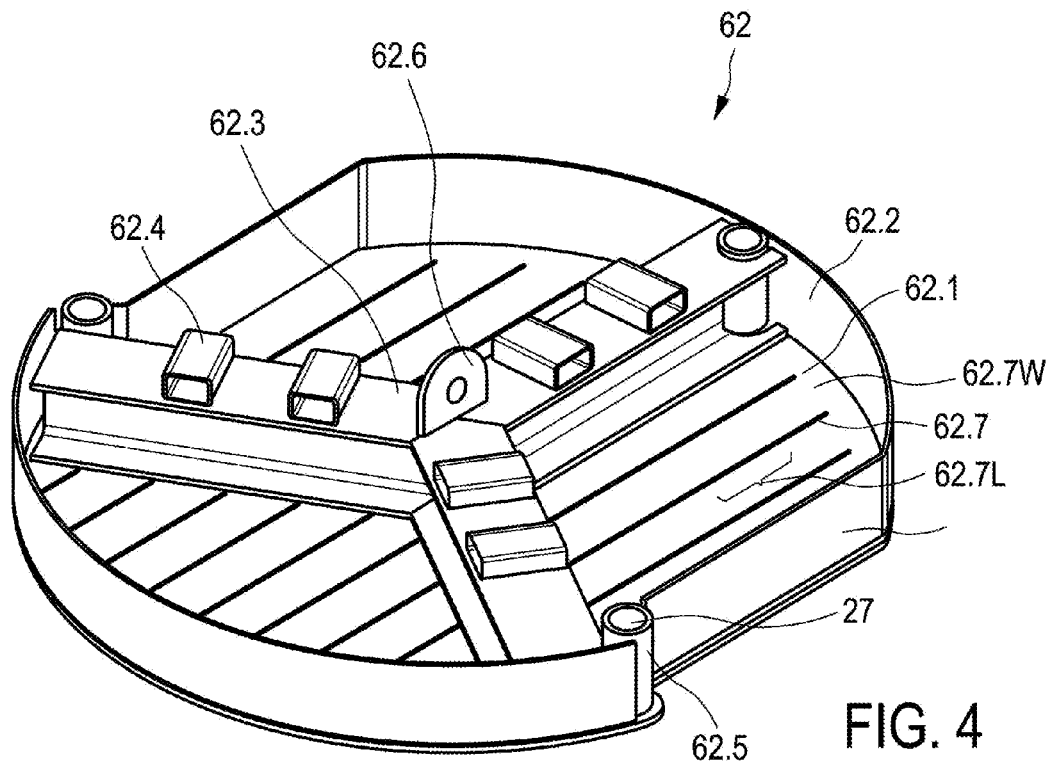
FIG. 4 a perspective view of a compression plate of the plate arrangement of the apparatus of FIG. 1.

FIG. 2 shows the vessel 10 with the lid 12 in an arrangement of plates as further described and symbolized in FIG. 4.

Figure 3:
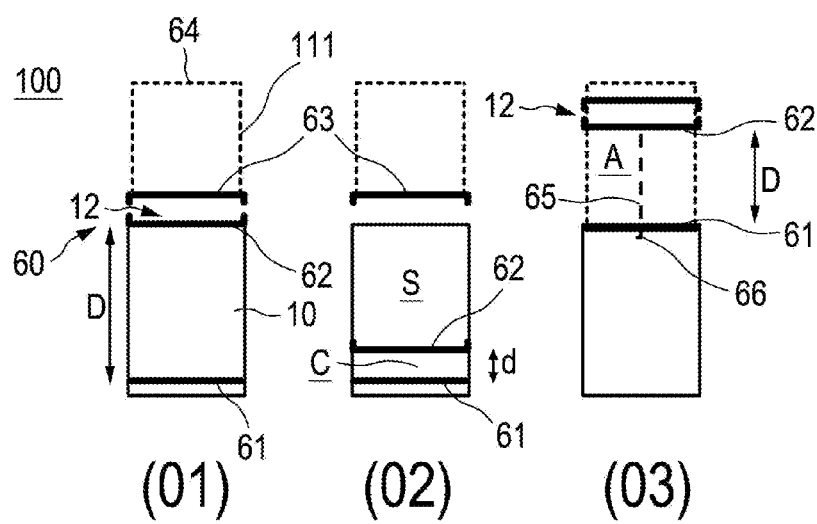
FIG. 3 a sketch of different preferred operating states of a plate arrangement of the apparatus of FIG. 1.

The plate arrangement 60 assigned to the vessel 10 and the linkage 23 of the drive 21 is shown in FIG. 3 in a first operating state O1, a second operating state O2 and a third operating state O3. The plate arrangement comprises a bottom plate 61, a compression plate 62, and a cover plate 63. The schematic view of FIG. 3 shows the operating states O1, O2, O3 of the recycling apparatus 100 with the vessel 10 and the drive part frame 120 providing the number of columns 111 and a drive 20 platform plate 64. As indicated in FIG. 1 the lid 11 is construed as a plan-parallel connection of the cover plate 63 and the compression plate 62 wherein the compression plate 62 is inserted into a cavity of the cover plate 63. Thus basically the plates 61, 62, 63, 64 are part of a coaxial aligned plate arrangement 60 wherein the bottom, compression and cover plates 61, 62, 63 are movable along the vertical axis Z and the platform plate 64 as part of the frame 120 is adapted to stabilize the linkage 23 and drive 21. All of the plates comprise the above mentioned openings 26, 27 to throughput the linkage and/or drive 23, 21, in particular the rods 24, 25 as guidance and drive rods for moving the plates 61, 62, 63.

Further as it is clear from FIG. 3 the cover plate 63 and the compression plate 62 are movable by the drive 21 independently from each other. However, the bottom plate 61 is linked to the compressing plate 62 such that the bottom plate 61 is pulled in a fixed connection distance D of large size in the third operation state O3 at least; here also in the first operation state O1. Therefore, in an upper state the distance D between the bottom plate 61 and the compression plate 62 is limited by a stop collar at the linkage beneath the bottom plate. Thus, once the compression plate has moved up to a certain distance D (upper distance) the bottom plate 61 has to follow the movement of the compression plates 62 due to a fixed linking rod of the linkage 23 between compression plate 62 and bottom plate 61. In FIG. 3 operation state O3 the linkage 23 with drive and guidance rod 24, 25 is symbolized as the linkage extension 65 with collar 66.

In the first operating state O1 the compression plate 62 is in the middle position for forming a melting space of larger size D between the compression plate 62 and the bottom plate 61 for melting bituminous material in the melting space wherein the bottom plate 61 is in the melting position.

In the second operation state O2 the compression plate 62 is in a lower position for forming a compression space of minor size d between the compression plate 62 and the bottom plate 61 for compressing solid residuals and/or composite material and other filler material in the compressing space.

The melted bituminous material is retained in a storing space S above the compression plate 62 for storing and/or discharging melting bituminous material, wherein the bottom plate 61 is in a compression position for providing the compression space C between the bottom plate 61 and the compression plate 62. The cover plate 63 in both operating states O1, O2 closes the vessel 10 and thus toxic or other gases or the like outgas is vented regularly to one or more of the options of a pipe nozzle 13 or circulating pipe arrangement 50 as described above.

In a third operating state O3 the compression plate is in an upper position for forming a discharge space between the compression plate 62 and the bottom plate 61 for discharging bituminous materials from the discharge space A as shown in FIG. 3 for operating state O3. The bottom plate then is in the so called discharge position in plane P as shown in FIG. 1.

The compression plate in a particular preferred construction is shown in FIG. 4. The compression plate 62 has a border frame 62.2 surrounding the plate 62.1 itself along the full diameter. The plate 62.1 itself is stabilized by a three axis bar arrangement 62.3 and connection elements 62.4 define a preferred distance to the cover plate 63. Further in the surrounding border 62.2 a through hole 62.5 is implemented to form openings for the guidance rods 25 as indicated by reference sign 27 in FIG. 1. Further on the three axis bar arrangement 62.3 of the plate 62 a joint tap 62.6 is provided with a hole such that the hole on the tap 62.6 can be reached through the piping nozzle 13 of the lid 12 as shown in FIG. 1.

Figure 5:
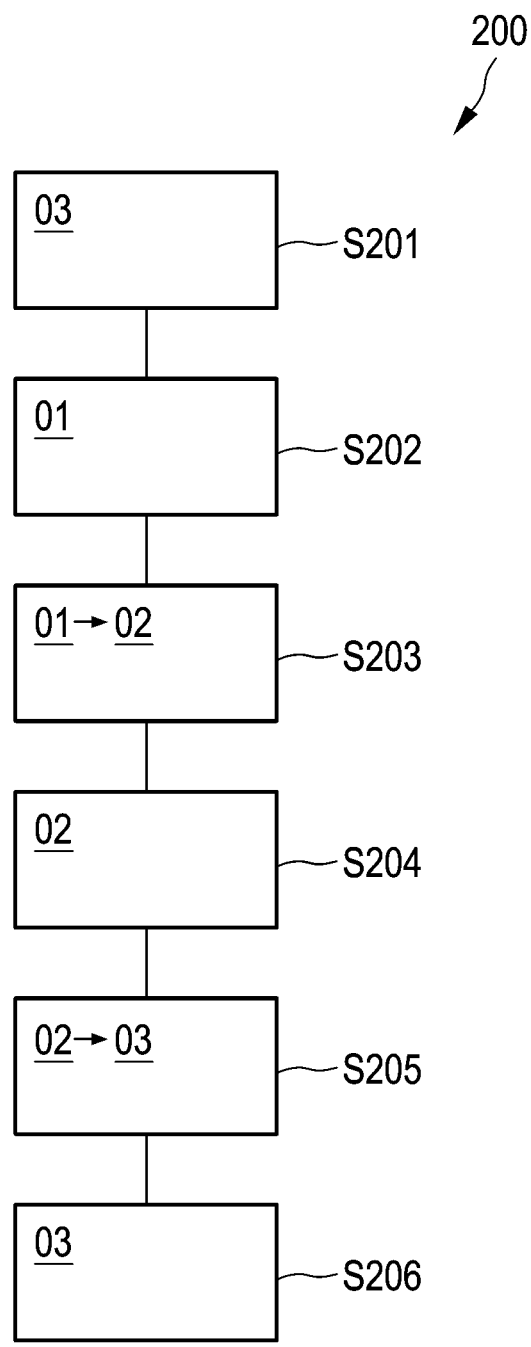
FIG. 5 a flow chart of a preferred embodiment of a method for recycling bituminous material bodies by melting.

FIG. 5 shows a flow chart of a method for recycling bituminous material bodies by melting in principle. The method can be executed by means of the recycling apparatus 100 as described in detail in FIG. 1 to FIG. 4.

In the method 200 in step S201 the recycling apparatus 100 provides the plate arrangement 60 in a third operating state O3 wherein a large space of large size D is provided to introduce bituminous material bodies like bituminous composite material bodies comprising a composite material and a bituminous material in solid form for recycling on the bottom plate 61. In the method step S202, the plate arrangement 60 is moved to operating state O1; thus the vessel 10 is closed by the lid 12 and the bituminous material bodies can be heated and once in the melted state can be circulated in the vessel and the circulation tube arrangement 50.

In step S203 the plate arrangement 60 is moved to the operating state O2 wherein the composite material is separated from the bituminous material by means of the compression plate 62 moving from the middle position of operating state O1 to the lower position of operating state O2. Thereby the solid non-melted material is compressed in the compression space C between the bottom plate 61 and the compression plate 62. Further upon accumulation of filler material below the compression plate 62 melted bituminous material before being forced through the orifices of the compression plate 62 is filtered in a partly built up press cake below the compression plate 62. Thereby a very effective passive filter means is provided such that in the storing space S above the compression plate 62 high quality and pure primary bitumen is retained apart from the compression cake in the compression space C. In a further step S204 the melted and purified primary bitumen in storage space S is drawn off from the storage space between compression plate 62 and cover plate 63. This can be achieved by means of the upper pipe nozzle 13 or additionally or alternatively by means of the side pipe nozzle 14 as described with FIG. 2.

The perforated plate 62.1 as shown in FIG. 4 of the compression plate 62 in this embodiment has through flow orifices 62.7 in the form of slits having a slower slit width and an upper slit length. The lower slit width 62.7 W is below 2 mm. The ratio of some of open cross sections of orifices in form of the slits 62.7 to the total closed area of the plate 62.1 of the compression plate 62 is in this embodiment well below 2% but above 0.001%. The side walls of the slits 62.7 in this embodiment are plan-parallel. It has been shown that perforations of plan-parallel side walls are easier to manufacture and well function within the filter function of the passive filter means as described above.

However, in a varied embodiment, the side walls can also be provided in a conus-like form as has been described in NL 1031868, which herewith is incorporated by reference in its entirety into this application.

According to the concept of the invention it has been shown that the passive filter means is provided in a particular preferred form when the downward velocity of the compression plate from moving between the middle position of operating state O1 to the lower position of the operating state O2 is well below 15 cm/min., in particular well below 10 cm/min. In this embodiment a downward velocity is variable in the range between 1 cm/min and 10 cm/min wherein the slit width 62.7w is below 2 mm and the ratio of open to closed cross sections is well below 2%.

Preferably a vacuum vent, valve or the like compensation opening is applied to the vessel. Thus a vacuum due to movement of the plates in the vessel can be balanced in the vessel by opening the compensation opening.

In a first embodiment the recycling vessel 10 has an interior volume of between 6 to 7 m$^3$ and a height of the vessel 10 in the direction of the vertical axis Z is 2 m. The diameter of the vessel 10 and the plate 62.1 of the compression plate 62 is in between 2 m to 2.50 m.

In a varied embodiment the interior volume of the vessel 10 can be in between 10 to 12 m$^3$ at a height of the vessel 10 of in between 3.5 m to 4.5 m, in particular at around 4.00 m. A diameter of the vessel 10 is preferably in between 2.5 m and 3.5 m, in particular at around 3.00 m.

Thus generally, the vessel is provided with an interior volume of in between 5 m$^3$ to 15 m$^3$ at a height of in between 1 m to 6 m at a diameter of in between 2 m to 4 m. In particular for the above assigned general dimensions of the vessel 10 the downward velocity and through flow orifices with a particular preferred combination for achieving a functioning passive filter means.

In step S205 the plate arrangement 60 is provided in the operating state O3 and the lid 12 thus opens, preferably automated, the vessel 10 wherein the compressed cake of compressed solid material is served in the plane P—and thus on height of the tray 40 and the slide element 30 as has been described with FIG. 1—. In step S206 the compressed cake can be moved to the tray 40 by means of the slide element 30 and the tray thereafter is activated thus to discharge the pressed cake into a container or the like volume.

Tar and/or bituminous fluid can be discharged in fluid form, preferably in fractions. The pressed cake can be used for further purposes e.g. in a clutched form or can be discharged as waste or shred or burnt. The method 200 described can be cycled continuously. Thus after finishing step S206 the vessel again can be charged with bituminous material bodies for melting as has been described with step S201. A charging can be done by means of a charging conveyor belt or the like charging means. Once the process of heating is started, a pressing means, like a cage or mesh, can be used to press solid bituminous material bodies into the melt below the fluid level. After a certain time, the lid can be closed.

The slide element 30 is formed as a kind of pusher and moves in the plane P parallel to the frame slide part 130 and the tray part frame 140; the pusher can be connected to a guide bar. Also a number of more than one pusher can be used to form the slide element 130, wherein the number of more than one pusher preferably move synchronously, i.e. move with the same velocity in the plane P. The rail bars 131 are adapted to provide a suitable advance force to the pusher. The rail bars 131 can be formed from profiled bars or piston bars; also hollow piston bars can be used to form a telescope drive to the rail bars 131.

Figure 6:
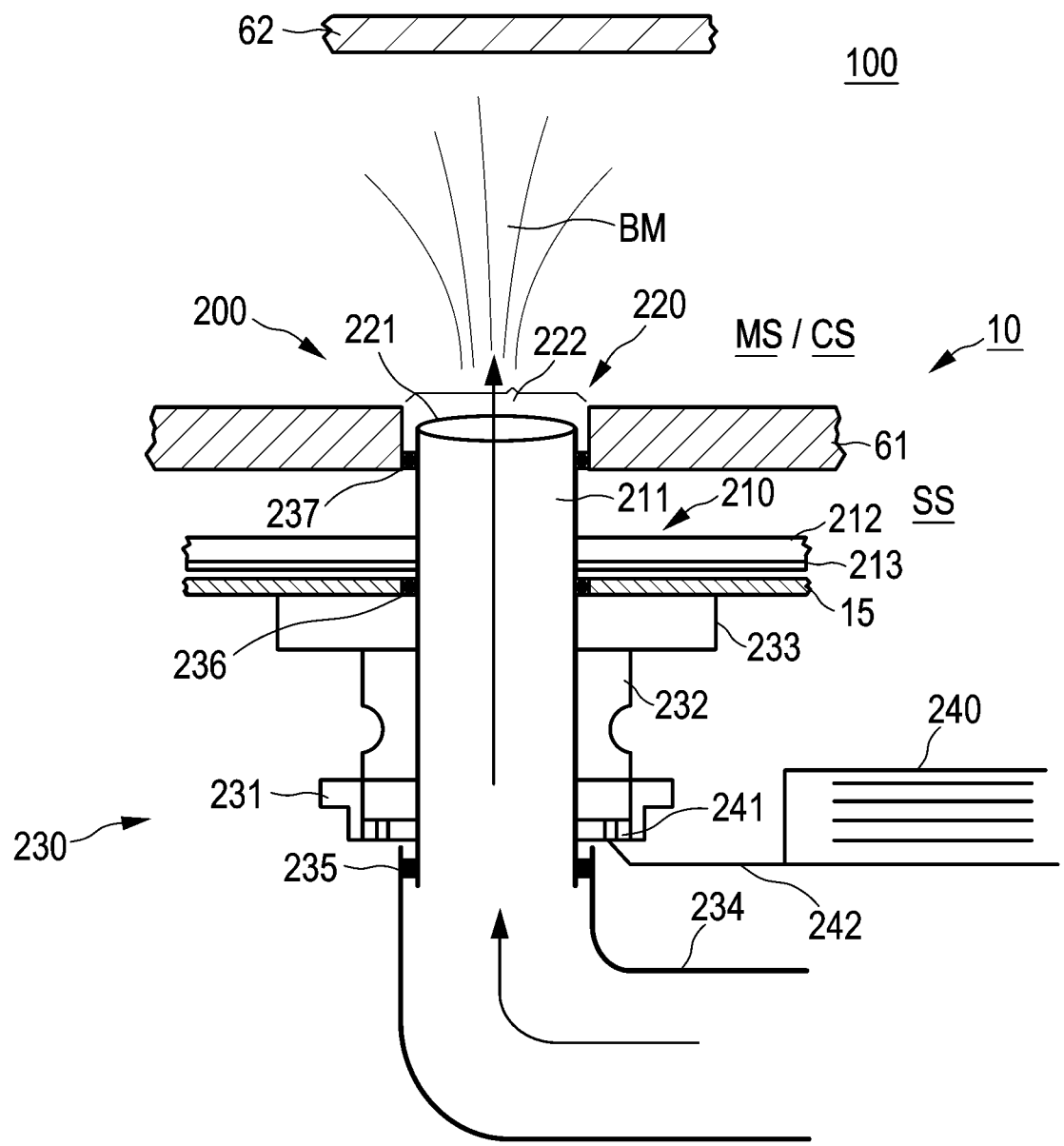
FIG. 6 a side cross-sectional view of a bottom plate of the plate arrangement with a vessel bottom and a stirring unit with a hollow shaft, wherein according to a first preferred variation an outlet of the hollow shaft opens out into a space between the bottom plate and a compression plate.

FIG. 6 shows a sectional view of a further developed embodiment of the recycling apparatus 100 in a lower area of the vessel part frame 110. The view of FIG. 6 depicts the vessel bottom 15 of the vessel 10 and the bottom plate 61, as has been described hereinbefore. Further, connected to the vessel 10 is a feed line and stirring arrangement 200 for feeding in and stirring fluid bituminous material BM into the vessel 10. FIG. 6 shows a stirring unit 210 with a shaft 211 and an elongated stirring member 212, which is rotatable arranged between the bottom plate 61 and the vessel bottom 15. The shaft 211 is adapted to rotate the elongated stirring member 212 in the stirring space SS between the bottom plate 61 and the vessel bottom 15. The elongated stirring member 212 in this embodiment is formed with scraper means, which allows to scrap solid composite material from the vessel bottom 15 by means of a scraper means 213. A rotating scraper keeping the vessel bottom clean is preferred for preventing piling up of bitumen on the bottom of the tank, causing impossible heat transfer from the pillow plate on the bottom of the vessel through the vessel bottom into the liquid bitumen. Not shown but also preferred, is a disc underneath the compression plate with a diameter smaller than the diameter of the plates is preferred. In this way the cake of solid composite material never reaches the wall of the vessel and can not block the flow of the regained bitumen out of the cake into the space underneath the bottom plate.

Further, an inlet unit 220 is formed in that the shaft 211 is formed as a hollow shaft connected to a hollow fluid guide with an upper outlet 222 into a space between the bottom plate 61 and the compression plate 62, in particular to a bituminous material to be recycled in the melting space and/or into a composite material in the compression space CS; in FIG. 6, the compression plate 62 is depicted only symbolically and would be arranged far above the opening out 22 of the fluid guide 221 in case a melting space MS is formed.

The fluid guide 221 comprising and connected to the hollow shaft 211 is in turn connected to a ring pipe 234 for pumping fluid bituminous material, which in turn is achieved by a pump of suitable size. As outlined before, a first and second flow pipe 51, 52 or other or more flow pipes like the first and second flow pipe, can be connected to the vessel in a flow connection to the interior space of the vessel by means of the fluid guide 221 in the hollow shaft 211.

The system of bitumen pump, bitumen ring pipe 234, hollow shaft 211, outlet 222 and the like fluid guide members is adapted to achieve a throughput volume of fluid bituminous material of more than 100 m³/h. The hollow shaft 211 is guided through the vessel bottom and the bottom plate. The bottom plate 61 therefore has a central access connection for the hollow shaft 211. The access connection may have a diameter of more than 50 mm, in particular more than 100 mm. By this arrangement of a feeding and stirring arrangement 200, a jet stream of bituminous material BM into the space between the bottom plate and the compression plate allows to provide turbulent fluid flow and thus efficient transfer of heat to the center of the bituminous material to be recycled.

Thus, in a first operating state, when the compression plate is in a middle position for forming a melting space MS of larger size between the compression plate 62 and the bottom plate 61, the melting of bituminous material in the melting space MS is with high efficiency and the time for melting the bituminous material to be recycled is decreased. Further solid residues are lifted.

In a second operating state, when the compression plate is in a lower position for forming a compression space CS of minor size between the compression plate 62 and the bottom plate 61 for compressing solid residues and other solid composite material in the compression space CS, still nevertheless a jet stream of bituminous material BM into the composite material can be used to break up the composite material. Still this can allow to detract fluid bituminous material from the composite material and further upheld the circulation of a heat transferring stream of fluid bituminous material through and around the composite material.

As further shown in FIG. 6, the hollow shaft 211 is connected to the vessel bottom by means of a coupling flange connection 230 providing a flange 231, a hollow box connector 232 with a bushing, and a connection plate 233 to the vessel bottom 15. The flow pipe connection of ring pipe 234 between the first and second flow pipes 51, 52 or further flow pipes is connected to the hollow shaft in fluid-tight manner, for instance using a first gasket 235. The hollow shaft is rotatable connected into the vessel interior of the vessel 10 in fluid-tight manner, for instance by means of a further dynamic gasket 236 and/or still another dynamic gasket 237 between hollow shaft 211 and vessel bottom 15 and/or bottom plate 61 respectively.

A gearing and/or motor arrangement 240 is connected to an annular gear 241, like for instance a crown gear, of the hollow shaft 211 in the flange connection 231. Thus, actuating rotating force to the hollow shaft is transmitted to the annular gear 241 by suitable force transmission means 242, like for instance a gear ring arrangement or the like.

Figure 7:
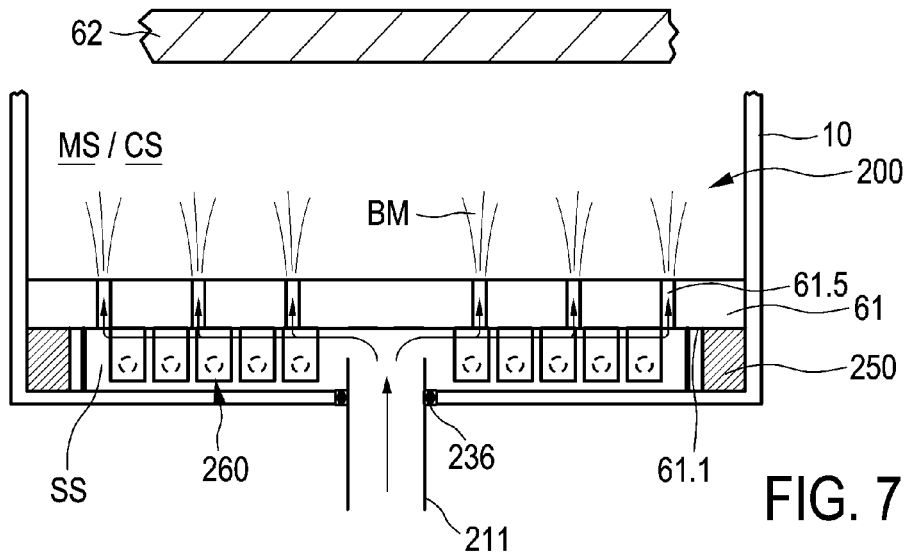
FIG. 7 a side cross-sectional view of a bottom plate of the plate arrangement with a vessel bottom and a stirring unit with a hollow shaft, wherein according to a second preferred variation an outlet of the hollow shaft opens out into a bottom space between the bottom plate and a vessel bottom and the bottom plate has a number of through flow orifices to a space between the bottom plate and a compression plate and further the bottom plate has a cup cladding formed on a bottom side formed by an arrangement of a number of fins.
Figure 8:
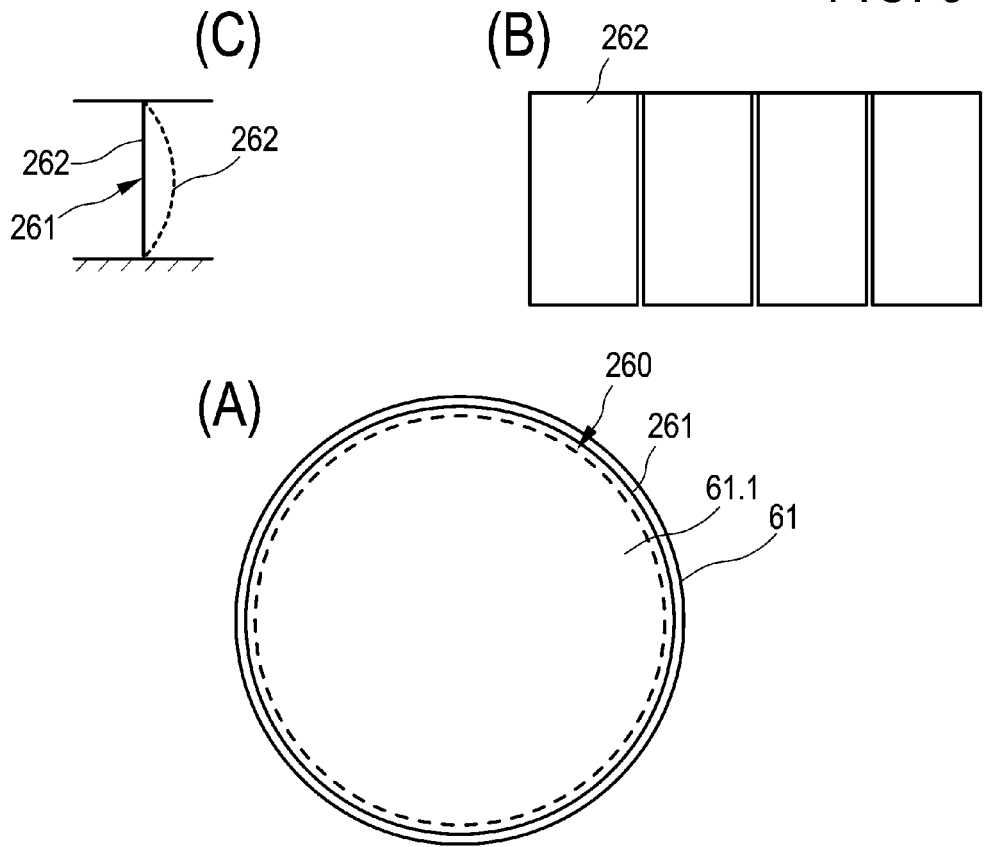
FIG. 8 in (A) a bottom view of the bottom plate, in (B) a sectional plan view of the cup cladding formed by an arrangement of a number of fins under the bottom plate, in (C) a sectional side view of a fin in a bended state.

FIG. 7 and details thereof in FIG. 8 show a further modification of the feeding and stirring arrangement 200, wherein, for simplicity, the same reference marks have been used for identical or similar elements or elements of identical or similar function. Thus, in the following, the main differences of the feeding and stirring arrangement 200 are described for FIG. 7 and FIG. 8 as compared to FIG. 6.

In the modification of the stirring and feeding arrangement 200 of FIG. 7, the hollow shaft 211 has an outlet 222 in the stirring space SS; more particular in this embodiment ends in the stirring space SS. Thus the bituminous material is let out into the stirring space between the vessel bottom 15 and the bottom plate 61. Thus, the hollow shaft 211 has an outlet 222 into the stirring space SS between the bottom plate 61 and the vessel bottom for forming a cushion stream of bituminous fluid BM into the space between the bottom plate 61 and the compression plate 62; i.e. in a second operating state into a composite material in the compression space CS or in a bitumunious material to be recycled in a melting space MS. The space between the bottom plate 61 and the compression plate 62 is a compression space CS of minor size in a second operating state when the compression plate 62 is in a lower position for compressing solid residues and/or is a melting space MS of larger size in a first operating state when the compression plate 62 is in a middle position for melting solid bituminous bodies to be recycled in the melting space. Thus, a composite material pressed in the compression space CS can be lifted by means of the cushion stream of the bituminous material BM. Further, in the first operating state, when the compression plate 62 is in a middle position for forming a melting space of larger size between the compression plate 62 and the bottom plate 61 for melting bituminous material in the melting space, heat transfer to the fluid bituminous material is increased and time for heating is decreased by injecting fluid heated bituminous material BM through the further through-flow orifices 61.5 in the bottom plate 61. The further through-flow orifices 61.5 are adapted to allow a through-flow of molten bituminous material BM into the compression space CS.

It should be mentioned explicitly that, as outlined before, the compression space CS depicted in FIG. 6 and FIG. 7 is meant to be a melting space MS when enlarged to a larger size between the compression plate 62 and the bottom plate 61, and thus the jet stream of bituminous material BM in FIG. 6 and, respectively, the cushion of bituminous material BM is led into bituminous material to be recycled when in a non-pressed state for being melted.

In the embodiment of FIG. 7 and FIG. 8 the bottom plate 61 on a bottom side 61.1 has a cup cladding 260, which is shown in more detail in FIG. 8. The cup cladding in this embodiment forms a circumferential fence with a circumferential arrangement of a number of fins 262 for forming the circumferential fence 261, as shown in view (A) of FIG. 8. The fins 262 are adapted to bent from an unbent state (solid line in FIG. 8, view (C)) to a bended state (dashed line in view (C) of FIG. 8). Thus the cup cladding can have the form of a hat and hinders the fluid bituminous material to escape to the side beyond the circumference of the stirring space. Bituminous material is pumped to a kind of box below the bottom plate in the stirring space SS. A pressure in the stirring space may be in the range of 1.5 bar which necessitates a respective enhancement of the vessel bottom 15. Further through flow orifices in the bottom plate, if any, are floated from below and solid bituminous material bodies thereby can be lifted. A distance of the lower edge of the circumferential fence to the vessel bottom 15 may be below 10 mm, in particular below 5 mm to the vessel bottom; this limits hydraulic forces to the vessel bottom. The distance of elements of the circumferential fence to each other can be below 5 mm, preferably approximately 2 mm. An element preferably has a thickness of below 5 mm, preferably approximately 2 mm or less, to allow bending of the element.

When lowering the bottom plate 61 to the vessel bottom 15, a damage of the vessel bottom 15 is avoided even at heavy load. Thus, the fins 262 shown in view (B) of FIG. 8 are made of a construction and/or material, which allows elastic deformation (elasticity) in a sufficient manner. The elements of the circumferential fence can be screwed or welded to the bottom plate preferably. Also this provision can allow to damp high load forces to prevent damage of the vessel bottom 15.

Further, as depicted in FIG. 7, a damping ring element 250 is adapted to receive the bottom plate 61 when in a lower position. The ring element 250 is adapted to receive pressing forces when the compression plate 62 is also in a lower position for pressing the composite material to the bottom plate 61. The ring element 250 thus forms a stop block to the bottom plate 61 and can further be supplemented with a damping element, like for instance a silicon layer or the like damping material. The ring element at the vessel bottom 15 is adapted to receive hydraulic forces and carries a bearing layer of silicon, whose thickness is less than 10 mm, preferably, in particular less than 5 mm. Thereby a sealing of the stirring space SS is achieved and thus fluid bituminous material is forced to the further number of through flow orifices in the bottom plate 61 as outlined to FIG. 7 and FIG. 8.

Preferably the solid composite material and/or the solid bituminous bodies are lifted. While lifted, a rotary movement thereof is achieved. The rotary movement of lifted bituminous bodies is achieved preferably as the flow pipes 51, 52 can guide bituminous fluid material in an angle, preferably of 15° or the like, to the vessel in a tangential outer direction. From external heat medium in the form of melt bituminous material is preferably provided at a temperature of between 200° C. to 260° C. or the like.

A fluid guide for guiding the bituminous material through the interior of the vessel 10, the flow pipes, 51, 52 and the hollow shaft 211 can be formed with a ring pipe connection of the flow pipes, 51, 52 and the hollow shaft 211. A pump for pumping the bituminous material preferably is adapted to provide a throughput of between 100 to 150 m$^3$/h of fluid bituminous material, preferably 120 m$^3$/h of fluid bituminous material. Said pipe is connected on one side by way of the flow pipes to a rather large opening in the vessel and on the other side to the hollow shaft 211, which is part of the stirring and feeding arrangement 200 at the central axis point at the bottom of the vessel 10.

An opening, in particular central opening, in the vessel bottom 15 and/or a bottom plate 61 may have a diameter of between 100 to 150 mm, preferably approximately 120 mm. The hollow shaft preferably has a diameter of of between 80 to 130 mm, preferably approximately 100 mm. In particular using the above mentioned dimensions a throughput is achievable to allow a strong turbulence for improving a heat transfer between the fed in bituminous material and the bituminous material to be melted and recycled. The time for melting the solid bituminous bodies thereby is decreased. A stream of fluid bituminous material preferably has a rather high velocity; in particular a stream of fed in melting medium of hot bituminous material is preferred. To make the solid bitumen melting in the hot liquid medium, enough speed of the melting medium in the vessel is preferably larger than 0 m/s, preferable between 1-100 m/s, more preferable between 0.10-10 m/s, more specific between 1-7 m/s. A particular increase of speed is achieved with propellers or the like accelerator means in a ring pipe to the hollow shaft, in particular in the flow pipes 51, 52. In the flow pipes 51, 52, flow sensors can be provided to allow a flow measurement. Measurement values can be used to make conclusions about the state of the flow pipes; e. g. clogging thereof can be estimated.

Because of the partly floating solid bitumen in the vessel, propellers cannot be placed inside the recycling vessel 10. However, propellers can be placed outside the vessel into two or more external jet stream circulation guides, namely in this embodiment into the flow pipes 51, 51. Propellers are preferred to create the advantageous high velocity of the melting medium in the vessel. A positive displacement pump cannot create the required capacity and thus speed of the liquid melting medium, such as hot bitumen or hot bitumen compound. Centrifugal pumps can be used but with some deficiencies for pumping hot liquid bitumen. Preferably a positive discharge pumps, is used. e.g. a positive discharge pump can be formed as a gear pump or the like.

Fed in bituminous material is preferably used as a melting medium and preferably is formed as a hot bitumen, hot bitumen compound, hot oil, a cold dissolver of bitumen type or the like (e.g. Diesel). In operation the hot bitumen has a temperature of between 80° C.-200° C., preferable of between 120° C.-160° C., more preferable of between 160° C.-260° C.

The bottom plate 61 and/or the vessel bottom 15 preferably has a thickness of at least 3 mm, preferable a thickness of between 3-500 mm, more preferable 100 mm, in particular a thickness of between 50 to 100 mm. The lower border of thickness is achieved when the bottom plate 61 and/or the vessel bottom 15 are that much thin, that fluid bituminous material solidifies rather quick, due to loss of heat. Then solid bituminous material can be scraped from the bottom plate 61 and/or the vessel bottom 15 only with increased effort.

The vessel wall and/or the pipes in this embodiment preferably are enclosed in a pillow plated jacket or the like mantle as mentioned hereinbefore. Some, preferably all, pillow plated jacket or mantles can be operated with an internal pressure of 5-20 bar. Thereby an improved stream of thermal oil in the pillow plates is achieved and thus an improved thermal heat transfer. Each pillow plate system may have its own thermal medium pump, i.e. a secondary pump is provided for the thermal medium in addition to a primary pump for fluid bituminous material (in the flow pipes 51, 52 e.g.). Thereby a setting is possible to provide an equal heating of the vessel; also respective valves and a distributor can be used to adapt the stream of thermal medium in the pillow plates. The openings of the flow pipes 51, 52, in particular have a diffuser connection to the vessel or a manifold or the like branching of outlet pipes. Preferably the diffuser has an opening diameter of between 500 mm to 600 mm.

Through flow orifices in the compression plate and/or the bottom plate are adapted for draining the residue composite material upwards. They can have a widening, in particular a conical widening, in the flow direction of the bitumen streaming out of the residue, to prevent blocking up by the carriers or parts of the carriers. The diameter of the through flow orifices can vary from 1 mm-60 mm. The number of through flow orifices may range from 1 to 500.

Preferably backwards closing valves are provide in the compression plate and/or the bottom plate. The openings in the compression plate drain the residue upwards. Therefore backwards closing valves are preferred in the compression plate: By compressing the remaining, liquid bitumen is flowing upwards out of the remaining through the conical holes into the vessel. Preferably it can be prevented that the retained bitumen flows back onto/into the residue composite. This can be achieved by openings with a check valve or the like backwards closing valve. E.g. in the conical hole a conical stop can be provide, lifted by the flow of the liquid bitumen and closing if there is no flow. The power/pressure to open the holes can depend on the shape and weight of the stops.

A draining system can be provided to the bottom plate. A draining system can be realized by a number of parallel strips on the bottom plate with a certain space between each other. The strips are parallel to the pusher movement. The strips have a width of 5-1000 mm, preferable a width of 10-50 mm. The height of the strips is 1-100 mm, preferably 2-20 mm. Between the strips on the bottom plate canals can be created in which the squeezed liquid bitumen is flowing to the outside of the bottom plate and dropping into the space between the bottom plate and the bottom of the vessel. This can be pumped out of the vessel without streaming back into the remaining. Alternatively a draining system can be realized by a perforated plate system. The perforated plate is supported by small square bars leaving room between the perforated plate and the bottom plate, so that the regained/squeezed out bitumen of a cake of compressed composite material can flow into the space underneath the bottom plate and pumped out of the vessel.

By oscillating movements of the compression plate in the fluid bitumen in the vessel, blocked up holes can be opened. The carrier package underneath the compression plate can act as a filter, as described with the first particular preferred developed variant hereinbefore, when there is a certain downwards speed of the plate. The minimum speed is v>0 m/s. When the downwards speed is too high the carrier package prevents penetration of the bitumen compound into the cook and requires too much power to lower the compression plate. Bituminous roofing is always a bitumen compound. A maximum speed required is preferably 1 m/s. A realistic speed is such that particles must have a certain maximum speed to find there way through the cake of pressed composite material in all directions. An optimal speed can be just above 0m/s, e.g. 0.001 m/s.

A heated disposal plate or tray 40 is preferred. This plate is connected to the side of the vessel opposite the pusher. In this way the residue is pushed from the bottom plate over the disposal plate into a disposal container. The disposal plate can move from the horizontal position while the pusher is moving into the vertical position dropping the residue into the disposal container standing under the vertical disposal plate. The disposal plate is preferably heated to prevent sticking of the bituminous residue is small and can have at least the dimensions of the bottom plate.

Also the system can be monitored, controlled and/or regulated using such measurement values. Supervision of the apparatus 100 can be achieved by a camera installation of telemetry applications. In particular bituminous vapors or the like can be supervised. The apparatus can be enclosed in a housing to provide a containment or the like. An automated fire extinguishing installation can be provided, in particular in the containment.

In particular the invention comprises one or more of the apparatus and method embodiments as listed below.

1. Apparatus for recycling bituminous material bodies by melting, in particular for recycling bituminous composite material bodies comprising a composite material and a bituminous material, in particular roofing materials, in particular in the form of bituminous covering layers of roofing sheets, the apparatus comprising:

a vessel having a vessel wall surrounding an interior space of the vessel extending along a vertical axis of the vessel for receiving the bituminous material bodies, a bottom plate and a compression plate extending transverse to the vertical axis wherein at least the compression plate has a number of through flow orifices adapted to allow a through flow of molten bituminous material, wherein the plates are movable along the vertical axis such that in a first operating state the compression plate is in a middle position for forming a melting space of larger size between the compression plate and the bottom plate for melting bituminous material in the melting space wherein the bottom plate is in a melting position, in a second operating state the compression plate is in a lower position for forming a compression space of minor size between the compression plate and the bottom plate for compressing solid residues and/or solid composite material in the compression space, and wherein molten bituminous material is retained in a storing space above the compression plate for storing and/or discharging bituminous material, wherein the bottom plate is in a compression position, wherein the compression plate is movable from the middle position to the lower position.

2. Apparatus according to one of the preceding embodiments wherein the compression plate is movable from the middle position to the lower position with a downward velocity below an upper limit, wherein the upper limit of the downward velocity and the through flow orifices are in a form adapted to—retain the composite material and/or other solid residues in a state of operation below the compression plate when moving the compression plate from the middle position to the lower position with the downward velocity such that a passive filter means below the compression plate is provided by means of the composite material and/or other solid residues.

3. Apparatus according to one of the preceding embodiments wherein the upper limit of the downward velocity is between 10 cm/min and 15 cm/min.

4. Apparatus according to one of the preceding embodiments wherein the through flow orifices are in the form of slits having a lower slit width and an upper slit length.

5. Apparatus according to one of the preceding embodiments wherein the through flow orifices lower cross-sectional dimension, in particular lower width, in particular slit width, is below 10 mm, in particular below 4 mm, in particular below 2 mm.

6. Apparatus according to one of the preceding embodiments wherein the ratio of a sum of open cross-sections of orifices to the total closed area of the compression plate is below 10%, in particular below 5%, in particular below 2%, in particular below 1%.

Apparatus according to one of the preceding embodiments wherein the orifices have plan-parallel boundary surfaces.

8. Apparatus according to one of the preceding embodiments wherein a hydraulic and/or pneumatic drive is adapted to move at least the compression plate along the vertical axis from the middle position to the lower position with the downward velocity.

9. Apparatus according to one of the preceding embodiments wherein a drive is adapted to move at least the compression plate along the vertical axis by exerting pressure at least to a first number of drive rods adapted to move the compression plate between said positions.

10. Apparatus according to one of the preceding embodiments wherein a second number of guidance rods are adapted to establish a guidance link at least of the bottom plate to the compression plate wherein a lower distance between the bottom plate and the compression plate is variable dependent on the position of the compression plate, and an upper distance between the bottom plate and the compression plate is limited by a stop collar.

11. Apparatus according to one of the preceding embodiments wherein a drive rod extends to a first line of openings in said plates and a guidance rod extends to a second line of openings in said plates.

12. Apparatus according to one of the preceding embodiments wherein a first line of openings in said plates is located on an outer circumference line on a respective plate and a second line of openings in said plates is located on an inner circumference line on a respective plate.

13. Apparatus according to one of the preceding embodiments wherein the number of drive rods and the number of guidance rods and respective openings are the same, in particular the number amounts to three, in particular each rod is arranged along a first and second inner circumferential cylindrical shape.

14. Apparatus according to one of the preceding embodiments wherein further comprising a cover plate wherein the compression plate is arranged between the bottom plate and the cover plate.

15. Apparatus according to one of the preceding embodiments wherein when the bottom plate is in a melting position, the bottom plate in a lowermost region of the vessel wall along the vertical axis and the vessel is closed by the cover plate and the compression plate is in an upper region of the vessel wall along the vertical axis.

16. Apparatus according to one of the preceding embodiments wherein when the bottom plate is in a compression position, the bottom plate in a lowermost region of the vessel wall along the vertical axis and the vessel is closed by the cover plate and the compression plate is in a lower region of the vessel wall along the vertical axis.

17. Apparatus according to one of the preceding embodiments wherein when the bottom plate is in a discharge position, the vessel is open and the compression plate and the cover plate are in a region above the vessel wall along the vertical axis, in particular the bottom plate in the region above the vessel wall along the vertical axis.

18. Apparatus according to one of the preceding embodiments wherein the interior space is adapted for receiving the bituminous materials, wherein the vessel wall has an inner wall defining the interior space and adapted for contacting the bituminous materials, and an outer wall defining an annular space between the inner wall and the outer wall, which annular space is adapted to receive a heating liquid for heating the interior space, in particular the bituminous materials.

19. Apparatus according to one of the preceding embodiments wherein the inner wall and the out wall are connected at a plurality of hubs, in particular each hub is formed as pillow plated hub, in particular of a weld hub.

20. Apparatus according to one of the preceding embodiments wherein the interior space is adapted to be open to the surrounding, in particular an overflow channel is connectable in a flow connection to the interior space.

21. Apparatus according to one of the preceding embodiments wherein the interior space is adapted to be pressurized with a pressure below atmospheric pressure, in particular with a vacuum pressure.

22. Apparatus according to one of the preceding embodiments wherein further comprising a microwave heating arrangement adapted to heat the interior space, in particular the bituminous materials.

23. Apparatus according to one of the preceding embodiments wherein further comprising:

a first and second flow pipe connected to the vessel in a flow connection to the interior space of the vessel wherein a propeller is adapted to circulate molten bituminous materials in the first and second flow pipe and the interior space of the vessel.

24. Apparatus according to one of the preceding embodiments wherein in a third operating state the compression plate is in an upper position for forming a discharge space between the compression plate and the bottom plate for discharging bituminous materials from the discharge space, wherein the bottom plate is in a discharge position.

25. Apparatus according to one of the preceding embodiments wherein the discharge position of the bottom plate is adapted such that the bottom plate surface aligns with a slider element of a slide and/or a discharge receipt tray, wherein the slide is adapted to move the slider element along the surface of the bottom plate to move the compressed solid residues and/or composite material to the discharge receipt tray.

26. Apparatus according to one of the preceding embodiments wherein the discharge receipt tray is pivotable from a horizontal surface position to a vertical surface position to release the compressed solid residues and/or composite material.

27. Apparatus according to one of the preceding embodiments wherein a head frame is adapted for supporting the vessel and/or a slide and/or a tray wherein a vessel part of the a head frame comprises a number of columns extending a along an outer circumferential cylindrical shape, in particular wherein a column is basically aligned in a radial extending vertical tier with a guidance rod and a drive rod.

28. Apparatus according to one of the preceding embodiments wherein a stirring unit is provided, wherein the stirring unit has a shaft and an elongated stirring member rotatable arranged between the bottom plate and a vessel bottom.

29. Apparatus according to one of the preceding embodiments wherein
a shaft of a stirring unit is adapted to rotate an elongated stirring member in a stirring space between the bottom plate and the vessel bottom and/or wherein
a shaft of a stirring unit is hollow with an upper outlet adapted to feed through a bituminous fluid, in particular a bituminous melting fluid.

30. Apparatus according to one of the preceding embodiments, wherein the shaft has an opening out into the space between the bottom plate and the compression plate, in particular for forming a jet stream of bituminous fluid into a bituminous material to be recycled in the melting space and/or into a composite material in the compression space between the bottom plate and the compression plate.

31. Apparatus according to one of the preceding embodiments, wherein the shaft has an opening out into the stirring space between the bottom plate and the vessel bottom, in particular for forming a cushion stream of bituminous fluid into a bituminous material to be recycled in the melting space and/or into a composite material in the compression space between the bottom plate and the compression plate, in particular wherein the bottom plate has a number of further through flow orifices adapted to allow a through flow of molten bituminous material.

32. Apparatus according to one of the preceding embodiments, wherein the bottom plate on a bottom side has a cup cladding, in particular formed by a circumferential arrangement, in particular of a number of fins.

33. Method for recycling bituminous material bodies by melting, in particular for recycling solid bituminous composite material bodies comprising a composite material and a bituminous material, in particular roofing materials, in particular in the form of bituminous covering layers of roofing sheets, in particular using an apparatus as claimed in one or more of the preceding embodiments, comprising the steps of:
receiving the bituminous materials in an interior space of a vessel having a vessel wall surrounding the interior space of the vessel extending along a vertical axis of the vessel, containing the bituminous materials above a bottom plate and allowing a through flow of molten bituminous materials through a compression plate extending transverse to the vertical axis wherein at least the compression plate has a number of through flow orifices adapted to allow the through flow of molten bituminous materials,
moving the plates along the vertical axis such that
in a first operating state the compression plate is in a middle position for forming a melting space of larger size between the compression plate and the bottom plate for melting bituminous materials in the melting space wherein the bottom plate is in a melting position,
in a second operating state the compression plate is in a lower position for forming a compression space of minor size between the compression plate and the bottom plate for compressing solid residues and/or composite material in the compression space, and wherein melted bituminous material is retained in a storing space above the compression plate for storing and/or discharging melted bituminous material, wherein the bottom plate is in a compression position, wherein
the compression plate is moved from the middle position to the lower position.

34. Method for recycling bituminous material wherein the compression plate is moved from the middle position to the lower position with a downward velocity below an upper limit, wherein the upper limit of the downward velocity and the through flow orifices are in a form adapted to retain composite material in a state of operation below the compression plate when moving the compression plate from the middle position to the lower position with the downward velocity such that a passive filter means below the compression plate is provided by means of the composite material and/or other solid residues.

35. Method according to one of the preceding embodiments wherein the upper limit of the downward velocity is between 10 cm/min and 15 cm/min.

36. Method according to one of the preceding embodiments wherein moving the plates along the vertical axis is further such that in a third operating state the compression plate is in an upper position for forming a discharge space between the compression plate and the bottom plate for discharging bituminous materials from the discharge space, wherein the bottom plate is in a discharge position.

37. Method according to one of the preceding embodiments wherein when moving the compression plate from the middle position to the lower position with the downward velocity composite material and/or solid residues are retained below the compression plate.

38. Method according to one of the preceding embodiments wherein composite material and/or solid residues are retained such that the bituminous material of a through flow of the bituminous material through the orifices is filtered, in particular to provide clean primary bituminous material.

39. Method according to one of the preceding embodiments wherein nonmelting additives, in particular polyester—and/or glass—fleece—and/or—fabric or mineral filler materials as additives, are added to the bituminous materials to improve filtering of the bituminous material.

40. Method according to one of the preceding embodiments wherein nonmelting additives are added to the bituminous materials in a concentration corresponding to an amount of up to 50 m2 to 100 m2 per volume of bituminous materials of up to 6 m3 to 11 m3.

41. Method according to one of the preceding embodiments wherein the bituminous materials comprise a polymer-modified bitumen compound, in particular wherein the polymer-modified bitumen compound forms a major part of the recycled bituminous material.

42. Method according to one of the preceding embodiments wherein the bituminous material bodies comprise filler material residues, in particular inlaids (such as polyester—or glass-fleece or—fabric or mineral filler materials) or unwanted residues (such as slate chippings) wherein the filler materials form a minor part of the bituminous material bodies.

43. Method according to one of the preceding embodiments wherein the bituminous material is heated by a heating liquid, in particular a heating liquid circulated in the annular space and/or heated by a microwave energy.

44. Method according to one of the preceding embodiments wherein the compression plate is hydraulically and/or pneumatically moved.

45. Method according to one of the preceding embodiments wherein the compression plate and/or the bottom plate are guided and/or are driven by a number of rods.

46. Method according to one of the preceding embodiments wherein compressed solid composite material and/or solid residues are shifted from the bottom plate to a pivotable discharge receipt tray at a discharge position of the bottom plate.

The invention claimed is:

1. Apparatus for recycling bituminous material bodies by melting, the apparatus comprising:
a vessel having a vessel wall surrounding an interior space of the vessel extending along a vertical axis of the vessel for receiving the bituminous material bodies,
a bottom plate and a compression plate extending transverse to the vertical axis wherein at least the compression plate has a number of through flow orifices adapted to allow a through flow of molten bituminous material, wherein the plates are movable along the vertical axis such that
in a first operating state the compression plate is in a middle position for forming a melting space of larger size between the compression plate and the bottom plate for melting bituminous material in the melting space wherein the bottom plate is in a melting position,
in a second operating state the compression plate is in a lower position for forming a compression space of minor size between the compression plate and the bottom plate for compressing solid residues and/or solid composite material in the compression space, and wherein
molten bituminous material is retained in a storing space above the compression plate for storing and/or discharging bituminous material, wherein the bottom plate is in a compression position, wherein
the compression plate is movable from the middle position to the lower position; and
further comprising a stirring unit, wherein the stirring unit has a shaft and an elongated stirring member rotatable arranged between the bottom plate and a vessel bottom.

2. Apparatus according to claim 1 wherein the compression plate is movable from the middle position to the lower position with a downward velocity below an upper limit, wherein
the upper limit of the downward velocity and the through flow orifices are in a form adapted to
retain the composite material and/or other solid residues below the compression plate in a state of operation when moving the compression plate from the middle position to the lower position with the downward velocity, such that
a passive filter means below the compression plate is provided by means of the composite material and/or other solid residues.

3. Apparatus according to claim 2, wherein the upper limit of the downward velocity is between 10 cm/min and 15 cm/min and the downward velocity is above 0 cm/min.

4. Apparatus according to claim 2, wherein a hydraulic and/or pneumatic drive is adapted to move at least the compression plate along the vertical axis from the middle position to the lower position with the downward velocity and wherein the drive is adapted to move at least the compression plate along the vertical axis by exerting pressure at least to a first number of drive rods adapted to move the compression plate between said positions.

5. Apparatus according to claim 4, wherein a second number of guidance rods are adapted to establish a guidance link at least of the bottom plate to the compression plate wherein
a lower distance between the bottom plate and the compression plate is variable dependent on the position of the compression plate, and
an upper distance between the bottom plate and the compression plate is limited by a stop collar of the drive and/or guidance rods.

6. Apparatus according to claim 1, wherein the through flow orifices are in the form of slits having a lower slit width and an upper slit length, and/or—the orifices have plan parallel boundary surfaces.

7. Apparatus according to claim 1, wherein the through flow orifices lower cross-sectional dimension or lower width or slit width is below 10 mm.

8. Apparatus according to claim 1, wherein the ratio of a sum of open cross-sections of orifices to the total closed area of the compression plate is below 10%.

9. Apparatus according to claim 1, wherein at least one drive rod extends to a first line of openings in said plates and at least one guidance rod extends to a second line of openings in said plates, wherein
the first line of openings in said plates is located on an outer circumference line on a respective plate and the second line of openings in said plates is located on an inner circumference line on a respective plate.

10. Apparatus according to claim 9, wherein the number of drive rods and the number of guidance rods and respective openings are the same and wherein each rod is arranged along a first and second inner circumferential cylindrical shape.

11. Apparatus according to claim 1, further comprising a cover plate wherein the compression plate is arranged between the bottom plate and the cover plate, and wherein
when the bottom plate is in the melting position, the bottom plate in a lowermost region of the vessel wall along the vertical axis and the vessel is closed by the cover plate and the compression plate is in an upper region of the vessel wall along the vertical axis, and/or
when the bottom plate is in the compression position, the bottom plate in a lowermost region of the vessel wall along the vertical axis and the vessel is closed by the cover plate and the compression plate is in a lower region of the vessel wall along the vertical axis, and/or
when the bottom plate is in a discharge position, the vessel is open and the compression plate and the cover plate are in a region above the vessel wall along the vertical axis, and the bottom plate is in the region above the vessel wall along the vertical axis.

12. Apparatus according to claim 1, wherein the interior space is adapted for receiving the bituminous materials, wherein the vessel wall has an inner wall defining the interior space and adapted for contacting the bituminous materials, and an outer wall defining an annular space between the inner wall and the outer wall, which annular space is adapted to receive a heating liquid for heating the interior space, and/or the vessel comprising a microwave heating arrangement adapted to heat the interior space.

13. Apparatus according to claim 12, wherein the inner wall and the outer wall are connected at a plurality of hubs, wherein each hub is formed as a pillow plated hub or a weld hub.

14. Apparatus according to claim 1, further comprising a sealable venting means, wherein the interior space is adapted to be open to the surrounding, and an overflow channel is connectable in a flow connection to the interior space, and/or the interior space is adapted to be pressurized with a pressure below atmospheric pressure.

15. Apparatus according to claim 1, further comprising:
a first and second flow pipe connected to the vessel in a flow connection to the interior space of the vessel wherein a propeller is adapted to circulate molten bituminous materials in the first and second flow pipe and the interior space of the vessel.

16. Apparatus according to claim 1, wherein in a third operating state the compression plate is in an upper position for forming a discharge space between the compression plate and the bottom plate for discharging bituminous materials from the discharge space, wherein the bottom plate is in a discharge position, and/or the discharge position of the bottom plate is adapted such that the bottom plate surface aligns with a slider element of a slide and/or a discharge receipt tray, wherein the slide is adapted to move the slider element along the surface of the bottom plate to move the compressed solid residues and/or composite material to the discharge receipt tray.

17. Apparatus according to claim 16, wherein the discharge receipt tray is heatable and/or pivotable from a horizontal surface position to a vertical surface position to release compressed solid residues and/or composite material.

18. Apparatus according to claim 1, wherein a head frame is adapted for supporting the vessel and/or a slide and/or a tray wherein a vessel part of the a head frame comprises a number of columns extending along an outer circumferential cylindrical shape, wherein a column is aligned in a radial extending vertical tier with a guidance rod and a drive rod.

19. Apparatus according to claim 1, wherein the shaft of the stirring unit is adapted to rotate the elongated stirring member in a stirring space between the bottom plate and the vessel bottom and/or wherein the shaft of the stirring unit is hollow with an upper outlet adapted to feed through the molten bituminous fluid.

20. Apparatus according to claim 19, wherein the shaft has an opening out into the space between the bottom plate and the compression plate and/or the shaft has an opening out into the stirring space between the bottom plate and the vessel bottom.

21. Apparatus according to claim 20, wherein the shaft has an opening for forming a jet stream of bituminous fluid into a bituminous material to be recycled in the melting space and/or into a composite material in the compression space between the bottom plate and the compression plate.

22. Apparatus according to claim 1, wherein the bottom plate on a bottom side has a cup cladding formed by a circumferential arrangement or by a number of fins.

23. Method for recycling bituminous material bodies by melting using an apparatus as claimed in claim 1, comprising the steps of:

receiving the bituminous materials in the interior space of the vessel, containing the bituminous materials above the bottom plate and allowing a through flow of molten bituminous materials through the compression plate, moving the plates along the vertical axis such that the compression plate is moved from the middle position to the lower position.

24. Method according to claim 23, wherein the compression plate is moved from the middle position to the lower position with a downward velocity below an upper limit, wherein the upper limit of the downward velocity and the through flow orifices are in a form adapted to retain composite material in a state of operation below the compression plate when moving the compression plate from the middle position to the lower position with the downward velocity such that a passive filter means below the compression plate is provided by means of the composite material and/or other solid residues.

25. Apparatus according to claim 1, wherein the hollow shaft is connected to a fluid guide, which in turn is connected to a ring pipe for pumping fluid bituminous material such that a first and second flow pipe are connected to the vessel in a flow connection to the interior space of the vessel by means of the fluid guide in the hollow shaft.

26. Apparatus according to claim 25, wherein the shaft has an opening for forming a cushion stream of bituminous fluid into a bituminous material to be recycled in the melting space and/or into a composite material in the compression space between the bottom plate and the compression plate wherein the bottom plate has a number of further through flow orifices adapted to allow a through flow of molten bituminous material.

* * * * *